Oct. 3, 1944.  M. L. MARCOUX  2,359,324
APPARATUS FOR WELDING
Filed July 14, 1942  6 Sheets-Sheet 3
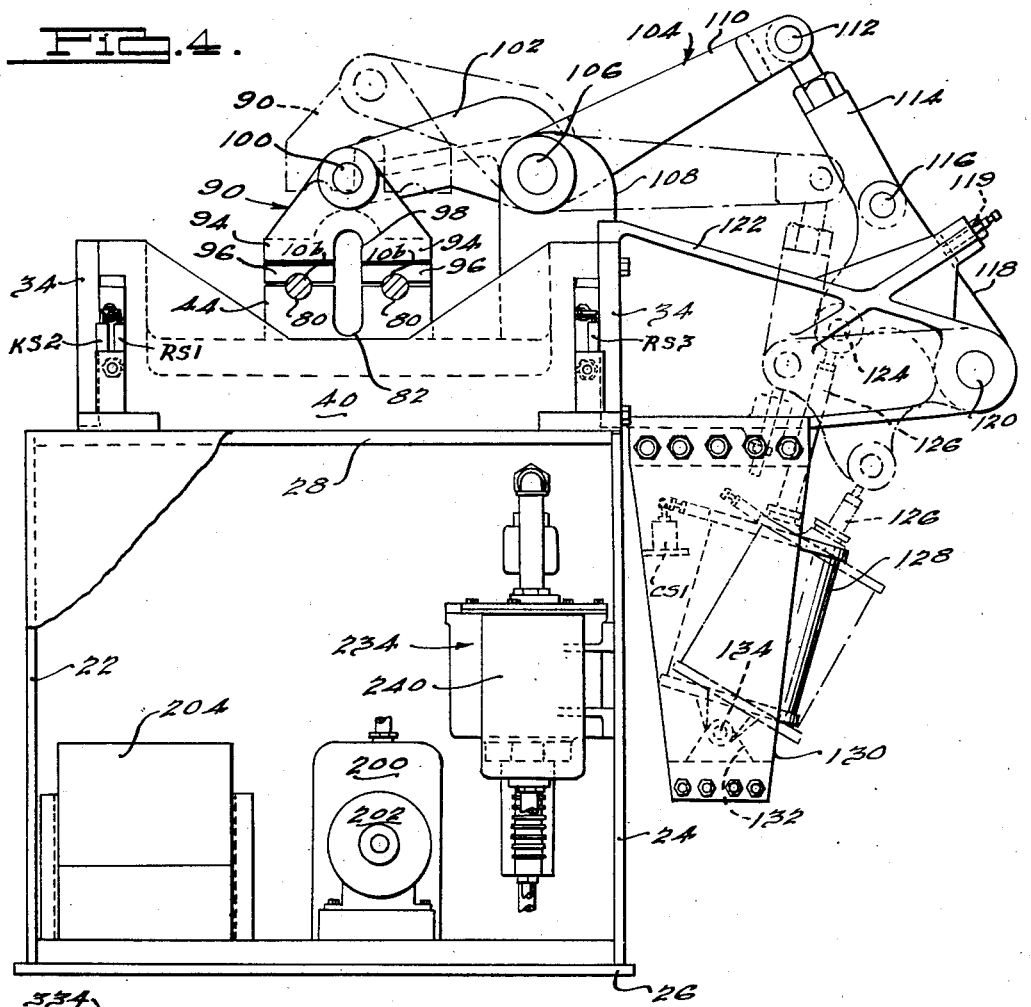
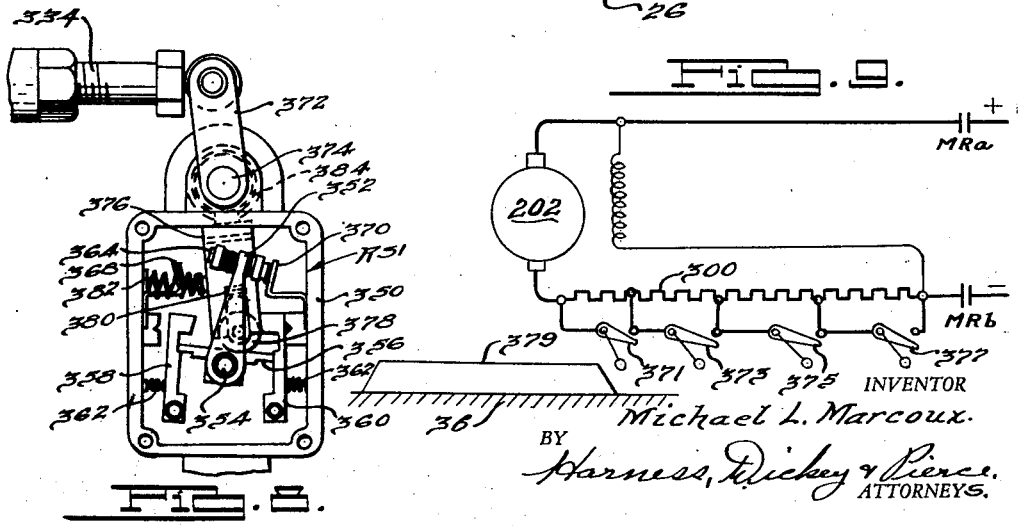
INVENTOR
Michael L. Marcoux.
BY Harness, Dickey & Pierce.
ATTORNEYS.

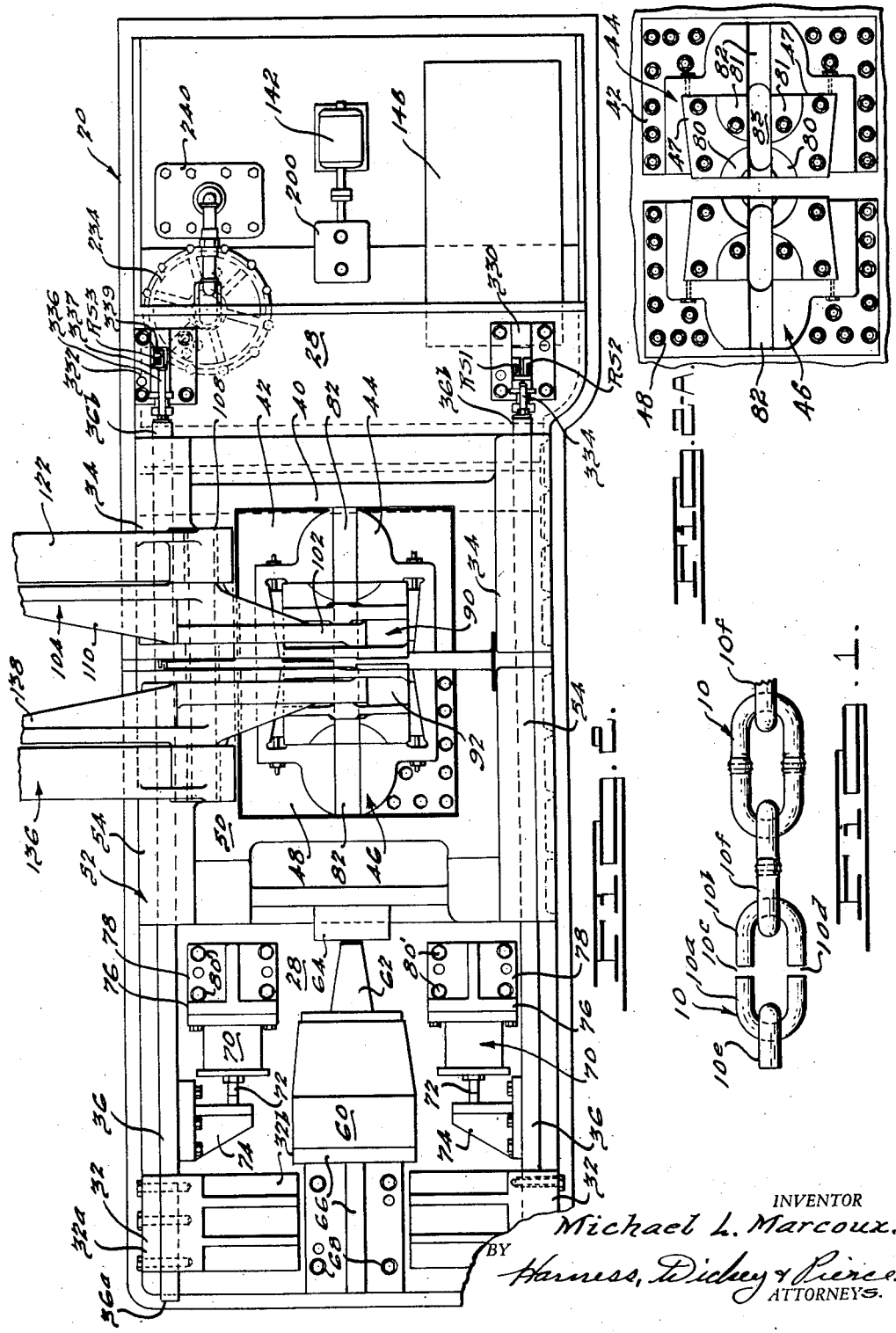

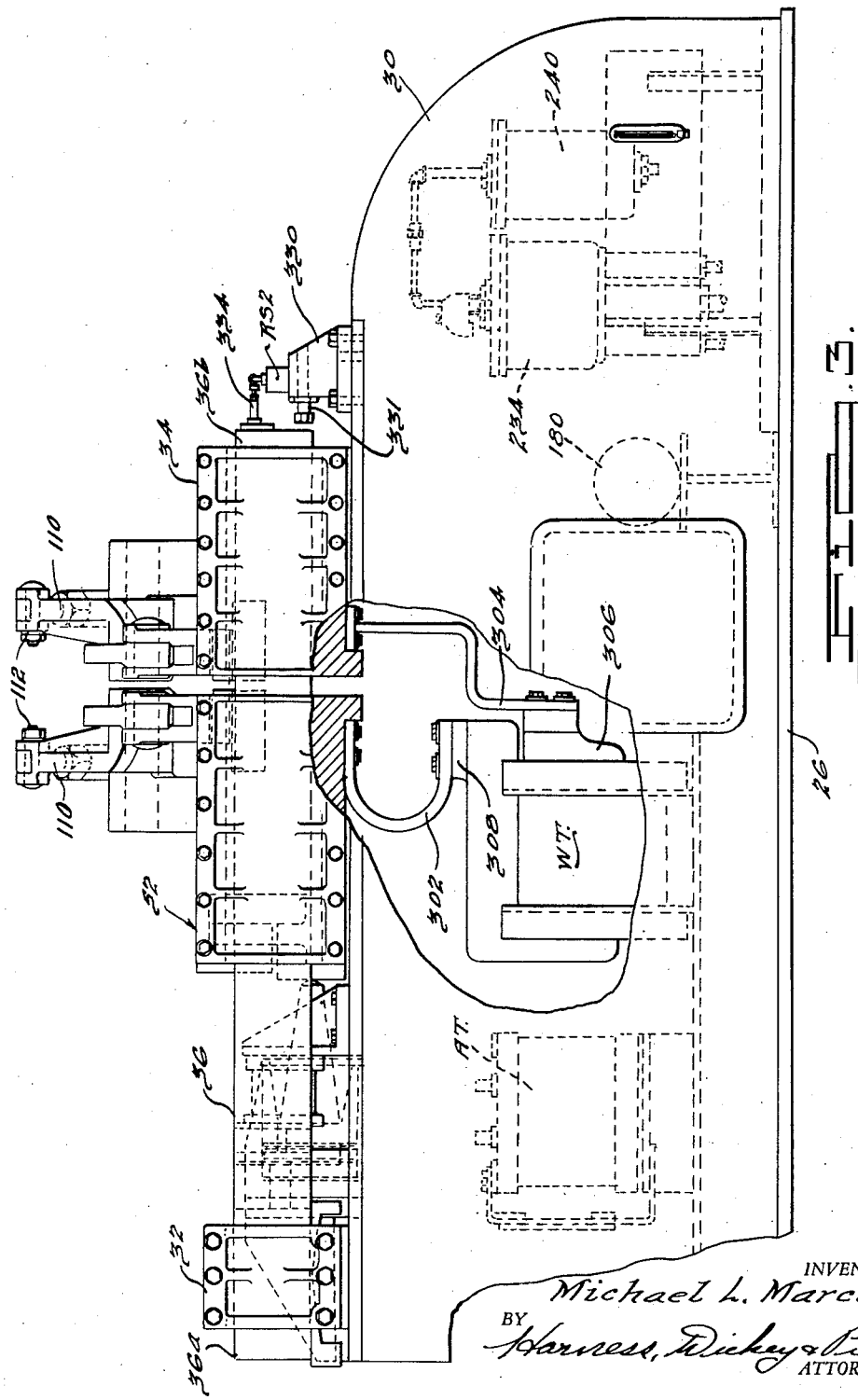

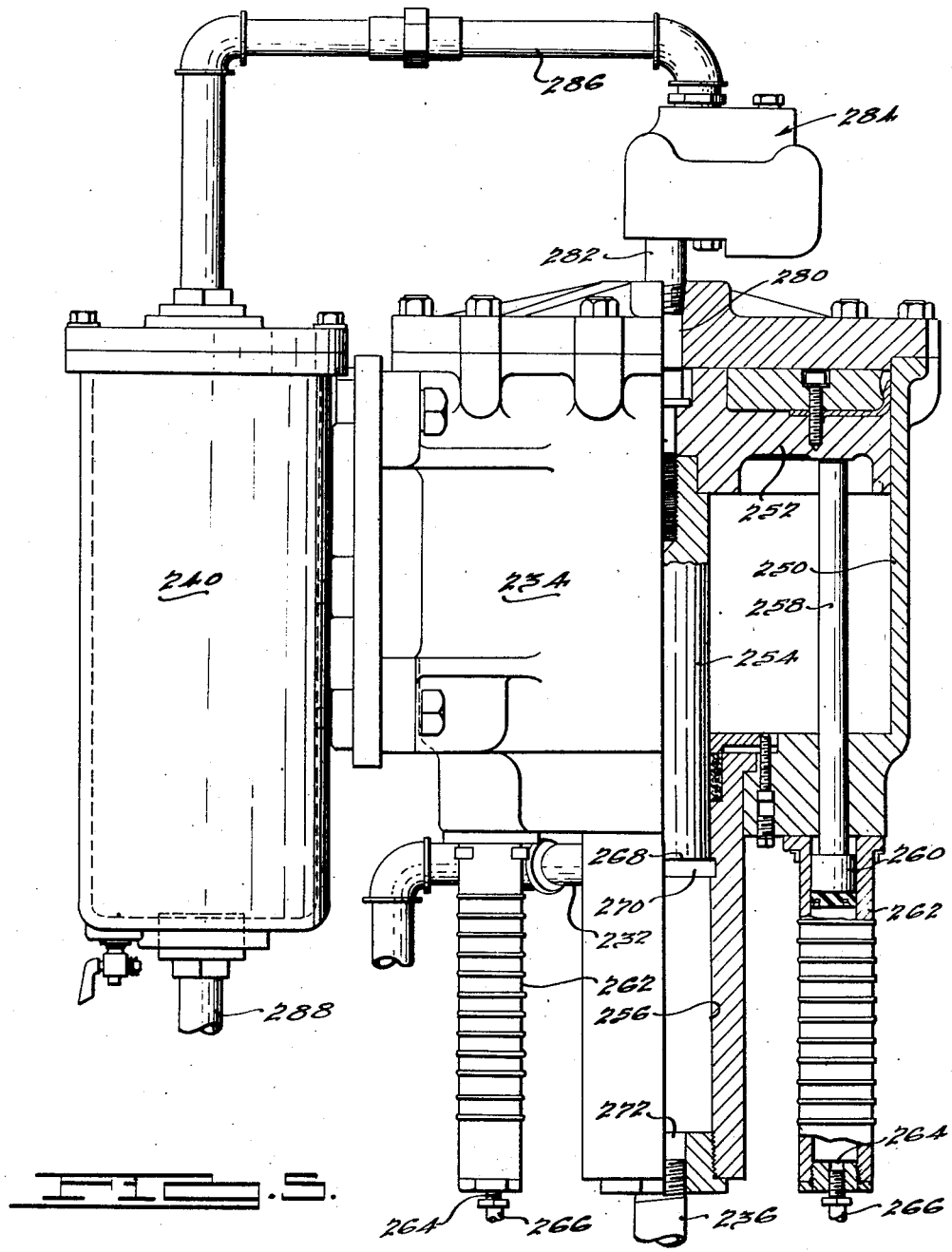

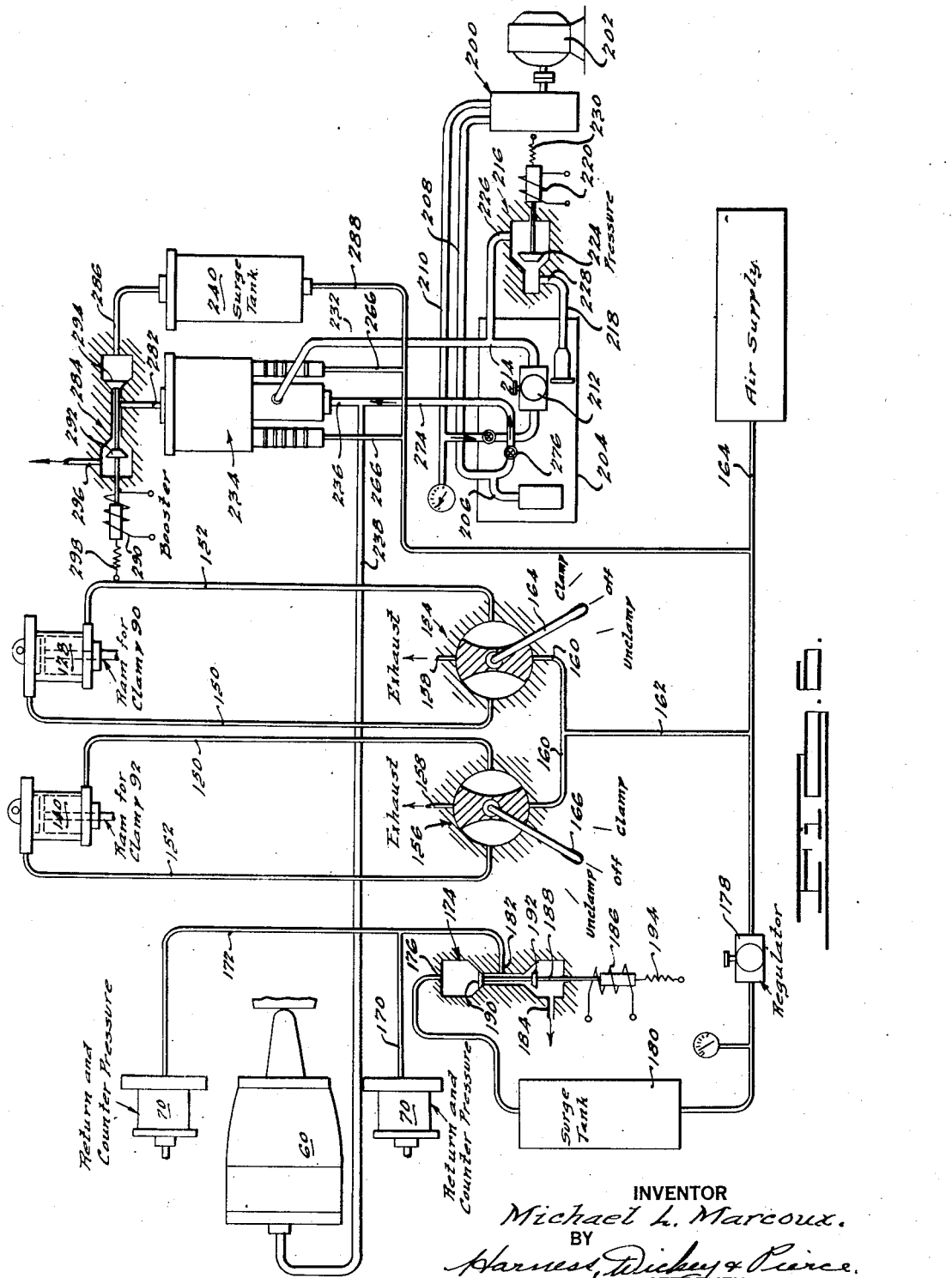

Patented Oct. 3, 1944

2,359,324

UNITED STATES PATENT OFFICE 2,359,324

APPARATUS FOR WELDING

Michael L. Marcoux, Detroit, Mich., assignor to Progressive Welder Company, Detroit, Mich., a corporation of Michigan Application July 14, 1942, Serial No. 450,865

14 Claims. (Cl. 219—4)

The present invention relates to electric welding, and in particular is directed to the provision of an improved method and apparatus, particularly adapted for, but not necessarily limited to, flash welding.

The principal objects of the present invention are to provide an improved method and apparatus, as aforesaid, which is simple, efficient and reliable in operation; to provide such a system embodying means for advancing the workpieces relative to each other during the heating period and embodying improved means for thereafter applying an upset pressure between the workpieces; to provide such a system wherein a hydraulic ram is utilized to effect the relative movement between the workpieces and wherein quick acting means are actuated at the conclusion of the heating period to advance the ram through the upset movement; to provide such a system wherein the quick acting means comprises a combination pneumatic and hydraulic booster which functions to isolate the ram from its primary source of fluid and to act, through the hydraulic fluid between the ram and the booster, to promptly increase the ram pressure and effect the upset movement.

Further objects of the present invention are to provide a system of the aforesaid type embodying improved means for controlling the feed movement of the workpieces during the heating period, so as to maintain the resistance at the joint consistent with flash welding conditions as distinguished from butt welding conditions; to provide such a system wherein the feed movement of the workpieces is controlled in accordance with the heating action, more particularly, in accordance with an electrical characteristic of the circuit which includes the joint between the workpieces; and to provide such a system wherein the last-mentioned electrically responsive elements are effective to temporarily interrupt the feed movement in the event the resistance of the joint falls, during the heating period, to an undesirably low value.

With the above as well as other and more detailed objects in view, which appear in the following description and in the appended claims, a preferred but illustrative embodiment of the invention is shown in the accompanying drawings, throughout the several views of which corresponding reference characters are used to designate corresponding parts and in which:

Figure 1 is a view illustrating the manner in which the present embodiment of the invention may be used to flash weld chain links;

Fig. 2 is a plan view of a machine embodying the invention;

Fig. 2A is a plan view of the work holding dies;

Fig. 3 is a view in side elevation of the machine of Fig. 2;

Fig. 4 is a fragmentary view illustrating the clamping mechanism associated with the clamps for the workpieces;

Fig. 5 is a view illustrating a preferred construction of a pneumatic hydraulic booster, for use with the machine of Fig. 2;

Fig. 6 is a diagrammatic view of hydraulic and pneumatic circuits embodying the invention;

Fig. 8 is a view of a limit switch suitable for use with the invention; and

Fig. 9 is a diagrammatic view of a modification of the invention.

Figure 7:
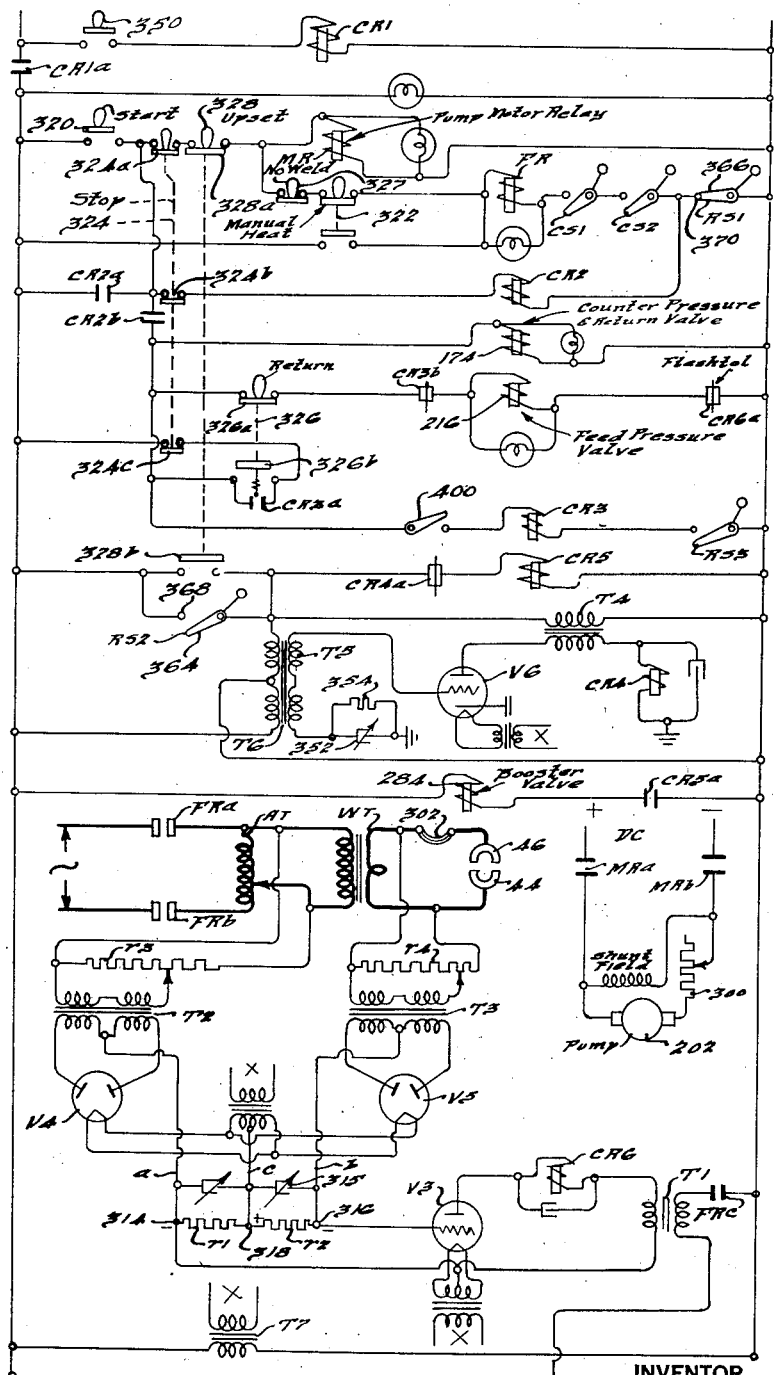
Fig. 7 is a diagrammatic view of electrical control circuits embodying the invention.

It will be appreciated from a complete understanding of the present invention that the improvements thereof may be used in connection with various types of electric welding. A preferred embodiment of the invention is in connection with the so-called flash welding of chain links, and in an illustrative but not in a limiting sense, the invention is so disclosed herein.

Referring particularly to Fig. 1, the links 10 of the illustrative chain are initially formed, in any desired manner, in two similar U-shaped halves 10a and 10b. In forming the chain, one or both of halves 10a and 10b are passed through the adjoining link or links and are thereafter seated, respectively, in the fixed and movable dies of the machine. Clamps are provided to secure the link portions in their respective dies. The fixed and movable dies, respectively, are electrically connected to the terminals of the secondary winding of the welding transformer. In making a weld, the welding transformer is energized and the opposed faces of the link portions are advanced toward each other. During this advance, two series of arcs are struck in the gaps 10c and 10d between the opposed workpiece faces. These gaps are shown as exaggerated in length in Fig. 1, although it will be understood that in practice the striking of the arcs therein may not occur until the spacing between the workpiece faces is considerably less, and in certain cases may not occur until the opposed faces of the workpieces actually engage each other. Due to irregularities of the surfaces of the opposed workpiece faces, it is not usually to be expected that such initial contact will extend uniformly over the workpiece faces.

The arc or arclike current which flows between the slightly spaced or irregularly engaged work faces brings portions of the opposed workpieces at and immediately adjacent the opposed faces thereof to a molten condition and heat flows from these molten areas into the bodies of the workpieces. This heating action progressively burns away the metal on the opposed faces, which loss of metal is compensated for by the feed movement of the machine. When the heating action has progressed to an extent sufficient to bring the opposed workpieces to a welding condition, the welding current is interrupted and a forging or upset pressure is applied to the workpieces which rapidly forces them together with an upset movement, thereby completing the weld.

The arcing condition between the workpieces is, of course, to be distinguished from a direct metallic conductive condition therebetween such as obtains in butt welding operations. This is for the reason that the heating effect of the arcs is considerably greater than the heating effect of an equivalent directly conductive flow and, consequently, the heating of the work can be accomplished with a considerably lower expenditure of power. The arc current also serves to burn away the metal forming the original opposed faces of the workpieces and, consequently, disposes of irregularities on such surfaces. The arc current appears to persist not only when the approaching workpiece faces are actually spaced from each other, but also when the molten faces actually engage each other with a pressure so low as to not interfere with the blowing out or burning away of the metal at the joint. If this engaging pressure, however, rises above a critical value, the current flow loses its arcing characteristics and the weld is said to "go into a butt." If this occurs, the resistance of the welding circuit is materially decreased and the welding current rises to an objectionably high value. Because of the large decrease in resistance, however, the heating effect of the increased current is less than the heating effect of the arcs and the work, consequently, does not rise to a point at which an efficient weld can be made. So far as the present applicant is aware, this difficulty has heretofore been met only by manually interrupting and momentarily reversing the feed movement, so as to cause the arcs to restrike, after which the feed movement is resumed. In accordance with the present invention, this difficulty is overcome in a considerably improved manner by controlling the feed movement in accordance with an electrical characteristic of the welding circuit, which varies when the weld tends to go into a butt. More particularly, this is accomplished by providing control mechanism which responds to the voltage across the arc, which voltage materially decreases when the work tends to go into a butt, and utilizing this control mechanism to reduce the rate of or entirely interrupt the feed movement until the voltage across the work rises to a satisfactory higher value.

Referring now to Figs. 2, 3 and 4, the machine comprises generally a longitudinally extending frame structure, having lateral side plates 22 and 24, a base 26 and an upper surface or bed 28. Preferably, the ends of the machine are normally enclosed by removable cover plates, such as 30 in Fig. 3, which cover plates are shown removed in Fig. 2.

The bed 28 of the machine is provided at each lateral side thereof with a pair of longitudinally spaced ways 32 and 34, which receive and slidably guide the longitudinal movements of a pair of die carrying bars 36, the ends 36a and 36b whereof project slightly beyond the corresponding guides 32 and 34, as is clearly shown in Figs. 2 and 3. The ways or guides 32 may be variously constructed, as will be understood. As shown, the guides 32 are right angular in shape, having the vertically extending legs 32a and the horizontally extending legs 32b, which rest upon and afford a means of rigidly securing the guides to the bed 28. The guides 34 are integrally connected together by an intermediate web portion 40 which, in turn, is rigidly secured to the bed 28 and which affords a support for the base 42 upon which the fixed die 44 is mounted. It will be understood that suitable insulating material may be interposed between the web 40 and the base 42, so as to insulate the die 44 from the machine frame.

The movable die 46 is rigidly secured to a supporting base member 48, which, in turn, is secured to but insulated from the web portion 50 of a generally channel-shaped upwardly presenting die carrying member 52, the vertically extending legs 54 whereof are provided with apertures through which the guide bars 36 extend. It will be understood that the movable die carrying member 52 may be secured to the bars 36 in any desired position of adjustment therealong, so as to cause the bars 36 and member 52 to move as a unit.

The movable die carrying member 52 is provided with a hydraulically actuated operating ram 60, the piston rod 62 whereof is disposed to engage a pad 64 which is secured to the rear portion of the die carrying member 52. As shown, the ram 60 is secured to a bracket 66, one leg whereof is secured to the bed 28 by studs 68. As described hereinafter, the ram 60, when actuated, serves to move the die carrying member 52 to the right. The return or leftward movement of the die carrying member, as well as a counterpressure which opposes the force of the ram 60, is afforded by a pair of preferably pneumatically operated rams 70, the piston rods 72 whereof project rearwardly into engagement with angle members 74, which are secured to and extend inwardly from the inner surfaces of the supporting bars 36. The cylinders of the rams 70 are secured to the upstanding legs 76 of angle brackets, the other legs 78 whereof are secured, as by studs 80, to the bed 28 of the machine. In the present machine, all of the rams 60 and 70 are single acting rams.

It will be appreciated that the fixed and movable dies 44 and 46 may be and preferably are complemental in shape, and that the particular configuration of these members is determined by the shape of the workpieces. The die 44 is illustrated as comprising a generally keystone shaped member 45 having a groove 82 extending throughout the length thereof, which groove is arcuately deepened at 83 to form a depressed seat to receive the link adjacent to the link being welded. A pair of generally rectangular die members 47 are bolted or otherwise rigidly secured to the member 45, and these members are provided with arcuate depressions 80 and 81. The depressions 80 receive one of the portions of the link being welded and the depressions 81 receive the horizontally disposed link, such as the link 10f of Fig. 1. It will be appreciated that the movable die 46 is similarly formed.

In order to positively secure the link portions in their respective dies 44 and 46, the cooperating clamps 90 and 92 are provided, which clamps may be and preferably are identical in construction. The clamp 90, associated with the fixed die 44, is shown in greater detail in Fig. 4, as being of generally U-shaped, downwardly presenting form, having legs 94 provided on their under surfaces with grooved portions 96. The portions are insulated from the legs 94 and are grooved complementally to the fixed die 44. The clamp 90 is also provided with a vertically arranged slot 98, which is complemental to the previously mentioned slot 82. The clamp 90 is pivotally connected, by means of a trunnion 100, to one arm 102 of a bell crank lever 104. Lever 104 is pivotally connected, by means of a trunnion 106, to a bracket 108 which projects upwardly from, but is rigidly secured to the previously mentioned guide member 34. The other arm 110 of the bell crank lever is pivotally connected by means of a pin 112 to one end of a link 114, the other end whereof is connected, by a pin 116, to an arm 118. The arm 118 is connected by a pin 120 to the supporting bracket 122, and is also connected, by a pin 124, to the piston rod 126 of the associated clamping ram 128. The bracket 122 is rigidly secured to the previously mentioned guide member 34 and is provided with a downwardly extending stirrup 130. The stirrup 130 carries a clevis 132 by means of which, and the associated pin 134, the ram 128 is rockably connected to the stirrup and, consequently, to the bracket 122. The ram 128 is preferably of double acting construction, arranged for pneumatic operation, and it will be understood that the clamp 90, as shown in Fig. 4, is in the clamping position, in which it is effective to clamp the corresponding half 10b of a chain link in place on the fixed die 44. If the connections for the ram 128 are reversed, however, the piston rod 126 thereof is withdrawn into the ram, which action rocks the arm 118 about the pivot 120 and, through the link 114, rocks the bell crank arm 102 in a clockwise direction and lifts the clamp 90 to the retracted dotted line position in which it does not interfere with the removal or insertion of workpieces from or into the fixed die 44.

As aforesaid, the other clamp 92 may be and preferably is complemetal to the clamp 90, and it may be and preferably is provided with raising and lowering mechanism which duplicates that described with reference to clamp 90. This operating mechanism comprises a bell crank arm 136 and a primary supporting bracket 138. It is to be understood, however, that the bracket 138 and, consequently, all of the other operating mechanism associated with the clamp 92, is carried by the movable die carrying member 52, so that during the traverse of the movable die 46 relative to the fixed die 44, there is no relative movement between the clamp 92 and the die 46. To distinguish it from the ram 128, associated with the clamp 90, the ram associated with the clamp 92 is designated 140 in the diagrammatic showing, Fig. 6.

Referring now to the diagrammatic showing of Fig. 6, the rams 128 and 140 are illustrated as being provided with air supply and exhaust lines 150 and 152, under control of usual four-way valves 154 and 156, respectively. The valves 154 and 156 are conventionally formed to accommodate exhaust lines 158 and inlet lines 160, which extend, through a common connection 162, to the air supply line 164. In the illustrated positions, the valves 154 and 156 are effective to close off the inlet and exhaust lines 160 and 158 and to isolate the lines 150 and 152. It will be understood that if the valve 154, for example, is swung to the right to the clamping position, it connects the line 152 to exhaust and connects the line 150 to the inlet 160. A reverse movement to the unclamping position, on the other hand, reverses these connections. Similar comments apply to the valve 156. In the present machine, valves 154 and 156 are provided with manually operated handles 164 and 166 and they may be arranged for convenient operation at the side of the machine, along with the other manual controls described in connection with Fig. 7.

The previously mentioned single acting return and counterpressure rams 70 are connected through air lines 170 and 172 to a usual electromagnetically operated three-way valve 174. As diagrammatically shown, the valve 174 is provided with an inlet 176, which is connected to the supply line 164 through a usual pressure regulator valve 178 and a surge tank 180; an outlet 182, which is connected to the previously mentioned lines 170 and 172; and an exhaust passage 184. The valve 174 is provided with an operating solenoid 186, the armature 188 whereof is effective, when the coil is energized, to operate valve elements 190 and 192, so as to close off the outlet 182 from the exhaust passage 184 and connect the passage 182 to the inlet 176. When the solenoid 186 is de-energized, a usual return spring 194 becomes effective to restore the armature 188 to the illustrated position, in which the inlet 176 is isolated and the passages 182 and 184 are interconnected through the now open valve element 192.

The means for supplying operating liquid, preferably oil, to the operating ram 60 during the heating periods, comprises a usual hydraulic pump 200, the delivery rate or pressure developed by which is proportional to its speed of operation. Pump 200 is provided with a driving motor 202, the speed whereof may be selectively controlled as described in connection with Fig. 7. Pump 200 draws liquid from an oil reservoir 204 through lines 206 and 208. The delivery circuit from the pump extends through line 210, a usual pressure regulating valve 212 and thence to a T-connection 214. The delivery circuit branches at the T-connection 214 and one branch extends through the normally open feed pressure control valve 216 and thence through line 218 back to the reservoir. Valve 216 may be of usual electromagnetically operated construction, and as diagrammatically shown, comprises an operating solenoid 220, which upon being energized is effective to move the valve element 224 into a position in which it isolates the inlet and outlet passages 226 and 228. When the solenoid 220 is de-energized, the spring 230 is effective to reopen the valve.

The other branch of the oil delivery circuit extends from the T-connection 214 through line 232, the booster 234 and thence through lines 236 and 238 to the ram. The booster 234 is normally in a position to permit free passage of oil from the line 232 to the lines 236 and 238. When operated, as hereinafter described, however, the booster closes off the line 232 and traps a column of liquid in the lines 236 and 238 and in the ram 60. The booster further acts as a motor, through the column of oil, to quickly and at high pressure advance the ram 60 through its upset movement.

Referring now to Fig. 5, the booster 234 and its associated surge tank 240 are shown in greater detail. As shown, the booster comprises a cylinder 250, which slidably receives an air operated piston 252. The piston 252 is provided with a piston rod 254, which is slidably received in, and constitutes the piston of, an oil cylinder 256, which is secured to and projects downwardly from the under side of the cylinder 250. The piston 252 is normally biased to its illustrated elevated position by a plurality of push rods 258, which are provided with pistons 260 which project into auxiliary air cylinders 262, which depend from the under side of the cylinder 250. As clearly appears in Fig. 6, the inlet passages 264 of the auxiliary air cylinders 262 are continuously connected through lines 266 to the source 164 of compressed air. The push rods 258 thus act continuously to urge the air operated piston to its illustrated retracted position.

In the retracted position, the lower end 268 of the piston rod 254 occupies a position slightly above the annular inlet passage 270, associated with the oil cylinder 256, and thus enables oil to be introduced into the cylinder through the port 270 and the previously mentioned line 232, which, as shown in Fig. 6, leads to the delivery port of the pump 200. The outlet passage 272 of the oil cylinder 256 is directly connected to the previously mentioned line 236, which, as shown in Fig. 6, leads to the ram 60. It is desirable to maintain the cylinder 256 entirely filled with oil to the level of the piston rod 254, and to accomplish this, the line 236 is, as shown in Fig. 6, permanently connected through line 274 and a check valve 276 to the oil reservoir 204. The reservoir 204 and the ram 234 may be so located within the frame of the machine, as shown in Fig. 4, as to enable a gravity feed of oil through the just-mentioned circuit. Also, when the booster is de-energized at the close of an upset operation, as described below, the piston 268 moves upwardly, enabling a flow of oil into the cylinder 256. In certain cases, the stress of the upset pressure stores enough resilient energy in the machine to cause the piston of the ram 60, upon release of such upset pressure, to return through the upset distance and refill the cylinder 256. In the absence of such return movement, the cylinder 256 is, of course, automatically refilled through line 274.

The air inlet 280 which opens into the air cylinder space 250 above the piston 252 is connected through a line 282, a usual electromagnetically operated three-way valve 284 and line 286 to its associated surge tank which, in turn, is permanently connected through line 288 to the previously mentioned source 164 of compressed air. The valve 284 is shown diagrammatically in Fig. 6 as being provided with an operating solenoid 290, which, upon being operated, is effective to move the valve elements 292 and 294, so as to disconnect the ram inlet 282 from the exhaust passage 296 and connect the same to the supply passage 286. Upon being de-energized, the solenoid 290 enables the spring 298 to restore the valve element to their illustrated positons, in which the supply line 286 is disconnected from the inlet 282 and such inlet is connected to the exhaust passage 296.

The electrical circuits for the system as a whole are shown in Fig. 7. In this figure, the previously mentioned pump motor is illustrated as being a usual direct current operated shunt motor, the armature and field circuits whereof are arranged to receive power from a usual direct current source, under control of the normally open contacts MRa and MRb of the pump motor relay MR. The armature circuit of the motor 202 includes a variable resistor 300, enabling the normal motor speed and, consequently, the normal feed pressure applied to the operating ram 60 by the pump 200, and the rate of feed movement of the movable die 46, to be adjusted to an appropriate value. Also, the resistor 300 may be manually varied during the feed movement, so as to give such feed movement a desired variable speed characteristic.

As shown diagrammatically in Fig. 7 and in some detail in Fig. 3, the terminals of the secondary winding of the welding transformer are permanently connected to the fixed and movable dies 44 and 46, which are otherwise insulated from each other. As is particularly shown in Fig. 3, a rigid bus bar 304 is connected at one end to the fixed die 44 and is connected at the other end to one of the transformer secondary terminals 306. The other transformer secondary terminal 308 is directly connected to one end of the flexible bus bar 302 and the other end of the latter member is directly connected to the movable die 46. Reverting to Fig. 7, the welding transformer WT receives power from a usual alternating current source 309, through an autotransformer AT and a pair of normally open contacts FRa and FRb of the firing contactor FR.

The previously mentioned control of the feed pressure applied to the ram 60 by the pump 200, in accordance with the condition of the welding circuit, is effected by means of a control relay CR6, the sole normally closed contact CR6a whereof is connected in series with the winding of the previously mentioned feed pressure valve 216 (Fig. 6).

Relay CR6 is connected in the anode circuit of a usual three-element valve V3, which may be and preferably is of the gas-filled discontinuous type. Valve V3 is normally non-conductive and, consequently, prevents the supply transformer T1, associated with relay CR6, from energizing the latter. The potential of the grid of valve V3 relative to its cathode is controlled in accordance with the relative values of two opposing potentials impressed across control resistors $r1$ and $r2$. Resistor $r1$ is connected across control leads $a$ and $c$ which, in turn, derive power through a usual full wave rectifier V4 from a center tapped transformer T2. Transformer T2, in turn, derives power from a potentiometer $r3$, which is connected across the primary winding of the welding transformer WT. The opposing potential is applied to resistor $r2$ across control leads $b$ and $c$, which are energized, through a rectifier V5, from a center tapped transformer T3. Transformer T3 is connected across a potentiometer $r4$ which, in turn, is connected across the secondary winding of the welding transformer WT. It will be understood that the relative potentials applied across resistors $r1$ and $r2$ are determined by the settings of potentiometers $r3$ and $r4$ and by the ratios of transformers T2 and T3. This adjustment is preferably such that so long as satisfactory arcing conditions obtain, which condition is reflected as a predetermined ratio between the primary and secondary potentials of the welding transformer WT, terminal 314 of resistor $r1$ is slightly positive relative to terminal 316 of resistor $r2$. On the other hand, if the weld tends to go into a butt, which condition, as previously mentioned, is evidenced as a material reduction in the resistance of the welding circuit, such tendency, due to the construction of the welding transformer, is evidenced as a reduction in voltage across the secondary winding of the welding transformer, which is proportionately larger than the reduction in voltage across the primary winding thereof. This relative drop in voltage raises the potential of the terminal 316 relative to the potential of the common terminal 318 and, consequently, elevates the potential of the terminal 316 to a value above that of the terminal 314.

Resistors r1 and r2 are connected between the grid and cathode of valve V3 in such relation that when terminal 314 is positive relative to terminal 316, the grid of valve V3 is negative relative to the cathode and the tube is, consequently, blocked. Under normal conditions of welding current flow, therefore, valve V3 is blocked, relay CR6 is de-energized, and contact CR6a thereof occupies the closed position in which it permits the feed pressure valve 216 to be energized. On the other hand, if the weld tends to go into a butt, terminal 316 becomes positive relative to terminal 314 and the grid of valve V3, consequently, becomes positive relative to the cathode. This action enables valve V3 to pass current and energize relay CR6, which action opens contact CR6a and de-energizes the feed pressure valve 216. This action, as appears from Fig. 6, completes a by-pass to the reservoir around the ram 60 and relieves the feed pressure from the ram. The consequent interruption of feed movement of the ram 60 again restores proper arcing conditions and results in a return to the normal value of the voltage across the secondary winding of the transformer. This action restores the potentials of points 314 and 316 to their proper relative values and again applies a blocking bias to the grid of valve V3. This latter action restores relay CR6 to the de-energized condition and causes its contact CR6a to reclose.

During the flow of welding current, temporary fluctuations in the secondary voltage of the welding transformer WT may be expected, and to cause the valve V3 to respond only to a persistent reduction in secondary voltage, it is preferred to connect a variable condenser bank 315 in parallel with the resistor r2. This condenser bank, as will be understood, interposes a predeterminably adjustable delay between the time a change in voltage of the welding circuit occurs and the time such change is reflected as a critical change in potential across the resistor r2.

The control system of Fig. 7 further includes a series of manually controlled switches which bear the legends, respectively, "Start," "Manual heat," "Stop," "Return," "No-Weld" and "Upset," which are additionally designated 320, 322, 324, 326, 327 and 328, respectively, and which cooperate with the previously identified control elements MR, FR, 174 and 216 to provide a complete welding sequence. These manually operated switches also cooperate with additional usual electromagnetic control relays CR2, CR3, CR4 and CR5. Relay CR4 is subject to control by a three-element valve V6, which may be and preferably is of the high vacuum continuous control type. In addition to the foregoing elements, the system comprises a plurality of automatically operated limit switches which respond, respectively, to the position of the movable die 46 and to the positions of the clamping rams. The switches which respond to the position of the movable die 46 are designated, respectively, RS1, RS2 and RS3.

Switches RS1 and RS2 may be of any suitable type arranged to operate at a limit position of the movable die. A suitable snap acting type of switch is illustrated in Fig. 8 as comprising a housing 350, within which a contact carrying arm 352 is carried by a pivot pin 354. The pivot pin 354 also carries a rocker arm 356, which cooperates with holding arms 358 and 360, which are biased toward each other by associated springs 362. The contact arm 352 carries a pair of contact elements 364 and 366, which are disposed to cooperate with stationary contacts 368 and 370. The operating arm 372 for the switch, which cooperates with the previously mentioned operator 334, is carried by a pivot pin 374, which also carries, within the housing 350, an arm 376. The arm 376 is provided with a roller 378 which continuously engages the rocker arm 356, under the influence of a backup spring 380. With the parts as shown, the contact 366 is in engagement with the contact 370, and the rocker arm 356 is locked in this contact engaging position by means of the arm 358. If the operating arm 372 of the switch is engaged, as by the operator 334, and swung to the right, the roller 378 is caused to roll along the rocker arm 356, during which movement the roller is retracted into the arm 376 against the force of the spring 380. At a critical stage of this movement, after roller 378 has passed to the left of the axis of the pin 354, the lower end of the arm 376 engages the upper end of the arm 358 and swings it in a counterclockwise direction, withdrawing it from holding engagement with the rocker arm 356. As soon as this withdrawal takes place, the energy stored in spring 380 is enabled to promptly snap the rocker arm 356 and, consequently, the contact arm 352 in a counterclockwise direction. This movement separates the contacts 366 and 370, and closes the contacts 364 and 368. This movement also brings the righthand end of the rocker arm 356 above the holding shoulder on the arm 360 and enables the spring 362, associated with the latter, to swing it counterclockwise to a position in which it locks the rocker arm 356 in the counterclockwise position. The arms 372 and 376 are connected together through a relatively heavy spring 384, the force of which is superior to the force of the spring 380 and so causes the arm 376 to move with the arm 372 until the arm 376 engages the indicated mechanical stops. By compressing the spring 384, however, the upper arm 372 is enabled to continue its movement. This additional travel of the upper arm allows for the upset movement of the machine which is initiated by the operation of the switches RS1 and RS2.

The switch RS1 further comprises a return spring 382, which is effective, upon withdrawal of the operator 334 from operative engagement with the arm 372, to return such arm to its illustrated position. During this return movement, roller 378 passes to the right of the pivot pin 354, moves the arm 360 out of holding engagement with the rocker arm 356, and enables the springs 380 and 362 to restore the parts to the illustrated position.

In the present system, switch RS1 is a normally closed switch and, consequently, only contacts 366 and 370 are utilized, as shown in Fig. 7. Switch RS2 may and preferably does duplicate switch RS1, but, since this switch is utilized as a normally open switch, only the contacts 364 and 368 are utilized, as shown in Fig. 7.

The switch RS3 in Fig. 7 is preferably a toggle action switch, which moves to the closed position at the end of the upset movement, remains in this position until the starting position is reached, opens when the starting position is reached, and remains in the open position throughout the full feed and upset movements of the machine. To provide this toggle action, the spring 382 of Fig. 8 may be removed. With this relation, if the arm 372 is swung to the right, it operates the switch, as before, and remains in its rightward position until it is again engaged and swung to its illustrated leftward position, during which leftward movement it effects an opposite operation of the switch. The operator for switch RS3 is shown in Fig. 2 as comprising a member 336, which carries two spaced operating lugs 337 and 339. The lug 337 engages the operating arm of switch RS3 when the movable die has completed its full feed and upset movements, thereby closing the switch. The lug 339 restores the switch RS3 to the open position when the movable die 46 has completed its return movement.

Switches RS1 and RS2 are directly mounted upon an abutment 330, which is secured to the bed of the machine adjacent the righthand end thereof, while switch RS3 is mounted upon a correspondingly located abutment 332 at the opposite side of the machine. The operator 334 for switches RS1 and RS2 is directly secured to the righthand end 36b of the bar 36 at the corresponding side of the machine, while operator 336 is similarly mounted on the bar 36 at the opposite side of the machine. Operator 334 is adjusted to open switch RS1 and close switch RS2 when the movable die has completed a normal feed movement, during which the work is brought to the proper temperature and is in readiness for the final upset movement. Switch RS1 may be positioned so that it is engaged and opened slightly after switch RS2 has been engaged and closed, so as to insure the application of the booster pressure before the normal feed pressure is relieved, although, due to the quick action of the booster relative to the oil operated elements, it is satisfactory to operate switches RS1 and RS2 at the same time.

It is further preferred to interlock the control circuits so that a normal feed movement of the movable die cannot be initiated unless the work clamps are in the clamping position. To accomplish this, a switch CS1 is associated with clamp 90 and a similar switch CS2 is associated with clamp 92. These switches are normally open, but close when the corresponding clamps are in the work engaging position. As shown in Fig. 4, the switch CS1, associated with clamp 90, is directly mounted on the associated supporting stirrup 130 in position so that the arm thereof is engaged and operated by an operator 131 carried by the ram 128 when the clamping mechanism reaches the active position. The switch CS2 for clamp 92 is, of course, similarly mounted on the corresponding supporting mechanism.

It is believed that the remaining details of the system may best be understood from a description of a typical operating sequence.

The electrical system may be conditioned for operation by closing button 350, which completes an obvious energizing circuit for relay CR1. Upon being energized, relay CR1 closes its contact CR1a and connects the control circuits to the usual alternating current supply represented by the line conductors L1 and L2. This latter action immediately completes energizing circuits for control transformers T6 and T7. Transformer T6, upon being energized, applies a blocking potential to the grid of valve V6 and charges up the associated grid condenser 352. These actions render valve V6 non-conductive. Upon being energized, transformer T7 supplies filament current to valves V3, V4, V5 and V6, which action is illustrated by the reference characters x applied to the terminals of the indicated circuits.

It is to be expected that the clamps 90 and 92 are normally in their retracted positions and that the movable die is normally in its retracted position. If not, however, the operator may operate the clamp valves 154 and 156 to cause the corresponding rams to separate the clamps, after which the handles 164 and 166 for the valves may be returned to their normal position. Also, the operator may momentarily operate the return button 326, which action opens its contact 326a and closes its contact 326b. The former action is without effect, but the latter action completes a circuit for the coil 186 of the counterpressure and return valve 174. As is evident from Fig. 6, closure of this valve directly connects the return and counterpressure rams 70 to the source 164 of air supply and enables them to return the movable die to the starting position.

If it is desirable to make a weld, the operator may properly locate a pair of link portions in the fixed and movable dies 44 and 46 in the previously described manner. Preferably, the operator thereupon operates the clamp valves 154 and 156 so as to cause the rams 128 and 140 to move the clamps 90 and 92 into engagement with the work, with a pressure considerably lower than the normal operating pressure. To do this, as will be understood, the operator restores the valve handles 162 and 166 to the off position after the clamps have engaged the work, but before the air pressure has built up in the rams 128 and 140 to the full value afforded by the source 164. With the work thus preliminarily clamped, the operator preferably operates the manual upset button 328, which action opens the contact 328a and closes the contact 328b. The former action is without effect, but the latter action completes an obvious energizing circuit for control relay CR5, which thereupon closes its sole contact CR5a.

Closure of contact CR5a completes an obvious energizing circuit for the booster valve 284, which thereupon (Fig. 6) connects the booster 234 to the source 164 of air pressure, through the surge tank 240. Upon being so connected, the booster piston moves downwardly and (Fig. 5) closes off the oil inlet 270, thereby trapping a column of oil in the lines 236 and 238. The continued movement of the booster piston through this trapped column of oil causes the ram 60 to move the movable die 46 in the feeding direction sufficiently far to cause the opposed workpiece faces to abut each other with a considerable pressure, which pressure acts to properly seat the workpieces in the dies. Such a seating movement is readily permitted in view of the fact that the clamps 90 and 92 are only lightly applied to the work, as aforesaid. It will be appreciated that the amount of movement required to effect this seating action is well within the range of movement afforded by the booster in view of the fact that the initial spacing between the opposed faces of the workpieces does not exceed, and is usually somewhat less than, the length of the upset movement.

Closure of contact 328b of the upset button also actuates certain of the circuits associated with the timing control relay CR4, but, since the period of closure of the upset button is usually shorter than the timing period afforded by relay CR4, these operations need not be described at this time.

With the workpieces thus properly seated, the operator may again move the clamp valves 154 and 156 to the clamping position and allow the clamping pressure to build up to the full value, after which, if desired, these valves may be returned to the off position. Thereafter, the operator may release the upset button 328 to its normal position, which action deenergizes the booster and relieves the pressure on the ram 60. In order to insure the return of the movable die to its starting position before the actual welding operation is initiated, the operator may follow the above seating operation by an operation of the return button 326, which functions, as before, to energize the rams 70 and return the movable die to the starting position. Such an operation is usually not necessary, however, in view of the fact that, upon operation of the start button, as described below, the rams 70 are enabled to build up a return pressure and return the die 46 to the starting position before a substantial feed pressure is built up in the ram 60.

To initiate the actual weld, the operator may now close the start button 320, which action completes obvious energizing circuits for the winding of the pump motor relay MR, for the firing relay FR, and for the control relay CR2. Upon being energized, the pump motor relay MR closes its contacts MRa and MRb and completes an obvious circuit to energize the armature and field windings of the pump motor 202, thereby placing this motor in operation and starting the pump 200 (Fig. 6).

At the present time, the feed pressure valve 216 is open and, consequently, the output of the pump 200 is circulated from the reservoir 204, through lines 206, 208 and 210, the regulator valve 212, and through lines 226 and 218 back to the reservoir, which circuit by-passes the ram 60.

Upon being energized, the firing relay FR closes its contacts FRa and FRb, which complete obvious circuits for the auto-transformer AT, energizing the same and also energizing the welding transformer WT. Under the conditions stated, it may be assumed that the opposed faces of the workpieces are too far separated to cause an arc to strike therebetween and, consequently, the only current which flows through the auto-transformer is the magnetizing current for the welding transformer.

Upon being energized, the firing relay also closes its contact FRc, which action energizes the transformer T1, associated with the automatic control relay CR6, and applies potential across the principal electrodes of the valve V3. If this action occurs prior to the energization of the welding transformer, as aforesaid, relay CR6 can be expected to momentarily pull in, since the blocking bias is not applied to valve V3 until the welding transformer is energized. Such momentary energization of relay CR6, however, would serve only to prevent energization of the feed pressure valve until after the welding transformer had been energized and would thus not have any effect upon the proper initiation of the welding action. If desired, of course, a slight delay may be provided in the closing movement of the contact FRc so as to insure energization of the welding transformer prior to energization of the transformer T1, which sequencing prevents the just-mentioned momentary operation of relay CR6.

It will be understood that the open circuit potential of the secondary winding of the welding transformer is sufficiently high, in relation to the voltage across the primary winding, to maintain the control valve V3 in a non-conductive condition and to, consequently, maintain the automatic control relay CR6 in the deenergized condition.

Upon being energized, the control relay CR2 closes its contacts CR2a and CR2b. Contact CR2a completes a holding circuit in parallel with the start button 320, which may, accordingly, be released to the open position. Contacts CR2a and CR2b, when closed, jointly complete obvious energizing circuits for the counterpressure and return valve 174 and for the feed pressure valve 216. Upon being energized, the counterpressure and return valve 174 connects the rams 70 to the source 164 of air pressure and builds up a pressure in these rams.

Upon being energized, the feed pressure valve 216 closes and interrupts the previously described hydraulic circuit which by-passes the operating ram 60, thereby causing the output of the pump to be delivered to the ram 60. This action enables the ram 60 to overcome the counterpressure of the rams 70 and initiate a feed movement of the movable die, at a rate determined by the setting of the pump motor rheostat 300.

The initial separation of the workpieces is preferably so adjusted in relation to the voltage of the welding transformer that at a relatively early stage of this feed movement a series of arcs are struck between the opposed workpiece faces, which action initiates the heating of the workpieces. The striking of these arcs somewhat reduces the secondary voltage of the welding transformer, but does not reduce this voltage sufficiently to unblock the control valve V3, associated with the automatic control relay CR6.

If the feed rate as established by the ram 60 is just right for the particular workpieces and the other operating adjustments of the machine, it may be expected that the welding circuit will maintain proper arcing conditions throughout the full feed movement, at the conclusion of which feed movement the ram switches RS1 and RS2 are operated to effect the upset and complete the weld, as described below. Normally, however, and as aforesaid, it may be expected that the feeding action will get slightly ahead of the heating action, thereby creating the tendency of the weld to go into a butt. This tendency, as aforesaid, is evidenced as a decrease in resistance of the welding circuit, a consequent rise in the welding current, and a consequent decrease in the secondary voltage of the welding transformer. This decrease in secondary voltage, if in excess of a critical value for which the automatic control circuits are set, alters the potential of the point 316 relative to the potential of the point 314 and brings the grid of the valve V3 to a positive value relative to the cathode of this valve. This action renders valve V3 conductive and enables transformer T1 to energize control relay CR6, which thereupon opens its sole contact CR6a. Upon being opened, contact CR6a interrupts the circuit for the feed pressure valve, causing this valve to reopen (Fig. 6), and recomplete the by-pass circuit around the ram 60. This action relieves the hydraulic pressure on the ram and enables the counterpressure afforded by the rams 70 to interrupt the feed movement and initiate a return movement. The thus initiated return movement of the movable die again initiates a separating movement of the opposed faces of the workpieces and again causes the flow of current between the workpieces to be arc-like in character. This action again raises the secondary voltage of the welding transformer, restores the potential of the point 316 to approximately its original value and again blocks the valve V3. The latter action de-energizes relay CR6 and causes its contact CR6a to close, thereby re-energizing the feed pressure ram 60 and re-initiating the normal feed movement.

It is believed to be evident that as often, in the course of a feed movement, as the weld tends to go into a butt, the automatic control relay operates, as aforesaid, to interrupt the feed movement and restore proper arcing conditions.

At the conclusion of the feed movement, the switch operator 334 carried by the bars 36 at the corresponding side of the machine engages and operates the switches RS1 and RS2. These switches, as aforesaid, operate with a snap action at an accurately adjustable position of the operating arms therefor and are further arranged so that continued movement of the operating arms is possible after the contacts have been operated. The operator 334 is thus enabled to continue to move the switch operating arms during the upset movement of the machine without further affecting the positions of the contacts.

Upon being closed, switch RS2 completes obvious energizing circuits for the previously identified control relay CR5, which thereupon re-energizes the booster 234. As before, the booster 234, when energized, isolates the lines 236 and 238 from the pump 200 (Fig. 6) and forces the ram 60 to promptly effect the final or upset movement of the movable die. This final or upset movement may be interrupted by the resistance of the now cooling (see below) work-pieces, but if not, a final limit stop to such upset movement is afforded by the engagement of the ends of the bars 36 with the adjustable stops 331, which are carried by the abutments 330 (Fig. 3).

The opening of the ram switch RS1 interrupts the circuits for the firing relay FR and for the control relay CR2. Upon being de-energized, the firing relay opens its contacts FRa, FRb and FRc, terminating the flow of welding current to the work and de-energizing the supply transformer T1, associated with control relay CR6. Upon being de-energized, control relay CR2 opens its contacts CR2a and CR2b. These actions interrupt the circuits for the pump motor relay MR, for the counterpressure and return valve 174 and for the feed pressure valve 216. These actions stop the pump, connect the counterpressure return valves to exhaust, and recomplete the by-pass around the ram 60, thereby restoring the system to the original starting condition with the exception that the booster is active. As aforesaid, switch RS1 opens simultaneously, or almost so, with the closure of switch RS2, so that the just-mentioned actions occur substantially simultaneously with the beginning of the upset movement.

The release of the upset pressure is effected as follows. The closure of switch RS2 also completes obvious energizing circuit for transformers T4 and T5, associated with valve V6. Upon being energized, transformer T5 opposes the originally energized transformer T6 and enables the energy stored in the associated condenser 352 to discharge through the resistor 354. At the end of a timing period determined by the characteristics of this discharge circuit, the grid of valve V6 assumes a value at which this valve is conductive. This action enables transformer T4 to energize control relay CR4, which thereupon opens its contact CR4a and de-energizes relay CR5. Upon being de-energized, relay CR5 interrupts the circuit for the booster valve 284 and results in the return movement of the booster to the normal position. This action, as will be understood, relieves the pressure on the ram 60. It will be appreciated that the timing period afforded by condenser 352 is adjusted to allow the full upset movement and a following cooling period for the work.

At any time after the upset pressure is relieved, the work may be removed from the machine, and it will be understood that this may be accomplished by operating the clamping valves 154 and 156 (Fig. 6) to the unclamping positions, thereby causing the rams 128 and 140 to restore the clamps 90 and 92 to their retracted positions. Thereafter, as before, the return button 326 may be manually operated to recomplete a circuit for the counterpressure and return valve 174, thereby enabling the rams 70 to restore the movable die to the starting position in readiness for the next operation.

With the system as described above, the return button 326 is required to be manually maintained in the operated position throughout the full range of the return movement. If it is desired to effect the full return movement without requiring more than a momentary closure of the return button 326, the manual switch 400 may be moved to the closed position, thereby preparing a circuit for the auxiliary control relay CR3, which is subject to the previously described toggle acting limit switch RS3. As previously described, switch RS3 closes at the completion of the upset movement. To effect a return movement, the operator may close the return button 326, as previously described. If switch 400 is closed, this closure of the return switch, in addition to energizing the valve 174, associated with the rams 70, also completes a circuit for relay CR3. Upon being energized, relay CR3 closes its contact CR3a in parallel with the contact 326b, enabling the latter to be reopened without affect upon the return movement. At the conclusion of the return movement, switch RS3 snaps to the open position and de-energizes relay CR3. This action de-energizes the return valve 174 and restores the system to normal.

The previously mentioned manual heat button 322 is provided to enable the energization of the welding transformer without otherwise placing the system in operation, as will be evident. Similarly, the previously mentioned stop button 224 is provided to enable a welding operation to be interrupted at any intermediate stage. As will be evident, if the contacts 324a and 324b of the stop button 324 are opened, all of the circuits which would normally be closed in response to the operation of the start button are reopened, thereby de-energizing the pump motor relay MR, the firing relay FR, the control relay CR2, and the return and feed pressure valves 174 and 216. These actions terminate the flow of welding current and relieve both the feed pressure and the return pressure from the movable die. Similarly, if the stop button 324 is opened during a previously described automatic return movement, the opening of contact 324c de-energizes the control relay CR3 and, consequently, de-energizes the return valve 174.

The remaining manual control, namely, the No-Weld button 227 is provided to enable the completion of normal feed, upset and return movements of the machine without energizing the firing relay and, consequently, without energizing the transformer.

In certain cases, it is desirable to provide for an automatic variation in the operating speed of the pump motor 200 and, as shown in Fig. 9, this may be accomplished by providing a series of cam operated switches to commutate the resistance in the armature circuit of the motor. As shown, the several switches 371, 373, 375 and 377 are arranged to be operated by an operator 379 carried by one of the side bars 36. With such an arrangement, as the movable die approaches the fixed die, the switches 371, 373, 375 and 377 are successively closed, thereby causing the operating speed of the motor and, consequently, the operating speed of the ram to progressively increase during the feed movement. It will be appreciated that in the broader aspects of the invention, a variable speed characteristic other than a progressive increase in the speed of the motor may be obtained by correspondingly arranging the succession of switches or other elements which respond to the movement of the movable die.

Although only several specific embodiments of the invention have been described, it will be appreciated that various modifications in the form, number and arrangement of parts may be made without departing from the spirit and scope of the invention.

What is claimed is:

1. Welding apparatus comprising means for supporting a pair of workpieces, means comprising a fluid motor for effecting a feed movement between said workpieces, means passing a current between said workpieces which is normally of arc-like character so as to heat said workpieces, and means controlled in accordance with said heating action for stopping said fluid motor.

2. Welding apparatus comprising means for supporting a pair of workpieces, means comprising a fluid motor for effecting a feed movement between said workpieces, a source of fluid for said motor, means passing a current between said workpieces which is normally of arc-like character so as to heat said workpieces, and means controlled in accordance with said heating action for disconnecting said fluid motor from said source.

3. In a flash welder, the combination of fixed and movable dies for supporting a pair of workpieces, means for traversing the movable die relative to the fixed die so as to provide a feed movement between the workpieces, an hydraulically operated motor for applying a feed pressure to the movable die, a source of hydraulic fluid for said motor, elastic fluid operated means for applying a counter pressure which opposes the feed pressure, means for passing a current between the opposed faces of the workpieces so as to heat the same, and means controlled in accordance with said heating for disconnecting said motor from said source whereby to enable said counter pressure means to interrupt said feed movement.

4. In a flash welder, the combination of a pair of fixed and movable dies for supporting a pair of workpieces, means including an hydraulic motor for moving said movable die through a feed movement and an upset movement, means including a pump for supplying hydraulic fluid to said motor to effect said feed movement, and upset means comprising a combined pneumatic and hydraulic booster operable to isolate said motor from said pump and to act through said fluid to cause said motor to effect said upset movement.

5. In a flash welder, the combination of a pair of fixed and movable dies for supporting a pair of workpieces, means including an hydraulic motor for moving said movable die through a feed movement and an upset movement, means including a pump for supplying hydraulic fluid to said motor to effect said feed movement, upset means for applying hydraulic pressure to said motor to effect said upset movement, and control means actuable at the conclusion of said feed movement for rendering said pump ineffective and for actuating said upset means.

6. In a flash welder, the combination of a pair of fixed and movable dies for supporting a pair of workpieces, means including an hydraulic motor for moving said movable die through a feed movement and an upset movement, means comprising a pump and a fluid passage for supplying hydraulic fluid to said motor to effect said feed movement, a member movable to isolate said passage from said pump and to force the fluid in said passage to move said motor through said upset movement, and means for operating said member.

7. In a flash welder, the combination of a pair of fixed and movable dies for supporting a pair of workpieces, means including an hydraulic motor for moving said movable die through a feed movement and an upset movement, means comprising a pump and a fluid passage for supplying hydraulic fluid to said motor to effect said feed movement, a member movable to isolate said passage from said pump and to force the fluid in said passage to move the motor through said upset movement, and elastic fluid operated means for operating said member.

8. In a flash welder, the combination of a pair of fixed and movable dies for supporting a pair of workpieces, means including an hydraulic motor for moving said movable die through a feed movement and an upset movement, means comprising a pump and a fluid passage for supplying hydraulic fluid to said motor to effect said feed movement, a member movable to isolate said passage from said pump and to force the fluid in said passage to move the motor through said upset movement, elastic fluid operated means for operating said member, and control means operable at the conclusion of said feed movement for rendering said pump ineffective and for actuating said elastic fluid means.

9. In a welding apparatus, the combination of means for supporting workpieces for relative traverse through a feed movement and an upset movement, means including a fluid motor for effecting said movements, a source of fluid pressure for supplying said motor during said feed movement, upset means for applying fluid pressure to said motor to effect said upset movement, and control means for actuating said upset means, said apparatus further including means operably responsive to said control means for rendering said source ineffective during said upset movement.

10. In a welding apparatus, the combination of means for supporting workpieces for relative traverse through a feed movement and an upset movement, means including a fluid motor for effecting said movements, a source of fluid pressure for supplying said motor during said feed movement, upset means for applying fluid pressure to said motor to effect said upset movement and operable to render said source ineffective, and control means for actuating said upset means.

11. Welding apparatus comprising means for supporting a pair of workpieces, motive means for effecting a feed movement between said workpieces, means passing a current between said workpieces which is normally of arc-like character so as to heat said workpieces, means controlled in accordance with the heating action and disposed to assume one condition when said heating action is normal and to abruptly assume another condition in response to an abnormal heating condition, and means responsive to said abrupt change for stopping said motive means.

12. Apparatus as set forth in claim 11 wherein said heat responsive control means includes timing means for delaying a said abrupt change for a predetermined period after said heating becomes abnormal.

13. Apparatus as set forth in claim 11 including counter pressure means which, during said feed movement, continuously opposes the action of said motive means and becomes effective upon the stopping of the latter to cause a separatory movement of said workpieces.

14. Apparatus as set forth in claim 11 wherein the means controlled in accordance with the heating action comprises electric valve means disposed to abruptly change between conductive and non-conductive conditions, a source of control voltage, the value of which is determined by the character of the heating action, and means rendering the valve means responsive to said control voltage.

MICHAEL L. MARCOUX.